US006196467B1

(12) United States Patent
Dushane et al.

(10) Patent No.: US 6,196,467 B1
(45) Date of Patent: Mar. 6, 2001

(54) WIRELESS PROGRAMMING OR PROGRAMMABLE THERMOSTAT MOBILE UNIT FOR MULTIPLE SEPARATE CONTROLLER OR PROGRAMMABLE FIXED UNITS AND PROGRAMMING TRANSMISSION METHOD

(76) Inventors: Steve Dushane, 17170 Los Alimos St., Granada Hills, CA (US) 91344; Terry Zimmerman, 10810 Springfield Ave., Northridge, CA (US) 91326-3028; Grant Bohm, 19540 Sherman Way, Reseda, CA (US) 91335-3601; John Staples, 25751 Dillon St., Laguna Hills, CA (US) 92653

( * ) Notice: Subject to any disclaimer, the term of this patent is extended or adjusted under 35 U.S.C. 154(b) by 0 days.

(21) Appl. No.: 09/079,326

(22) Filed: May 14, 1998

Related U.S. Application Data

(63) Continuation-in-part of application No. 08/802,640, filed on Feb. 19, 1997.

(51) Int. Cl.[7] .............................. F23N 5/20; G05D 23/00
(52) U.S. Cl. ......................... 236/46 R; 236/94; 165/109
(58) Field of Search ................................. 236/51, 46 R, 236/94; 165/238, 209

(56) References Cited

U.S. PATENT DOCUMENTS

| 3,979,060 | * | 9/1976 | Tiercf ............................ 236/46 R |
| 4,718,599 | * | 1/1988 | Brown et al. .................. 236/46 R |
| 5,097,671 | * | 3/1992 | Jeong-Hun ..................... 236/94 X |
| 5,682,949 | * | 11/1997 | Ratcliffe et al. ............... 236/51 X |

* cited by examiner

Primary Examiner—William Wayner
(74) Attorney, Agent, or Firm—David T. Bracken

(57) ABSTRACT

The present invention allows the user to quickly and repeatedly program one receiver controller device at least controlling one or more heating or cooling devices for one desirably separate zone of occupation to another such receiver controller device set at least controlling another separate set of heating or cooling devices for another desirably separate zone of occupation. The realities of present day industrial and commercial buildings is that they comprise many such separate zones of occupation with separate heating or cooling devices controlled with separate controllers due to the diverse nature of the desired temperatures, dead bands for controlling such temperatures, temperature and device operation ramping, times of occupation, economization measures imposed for each zone, and the many similar aspects of thermostatic control described herein and in the prior art.

9 Claims, 13 Drawing Sheets

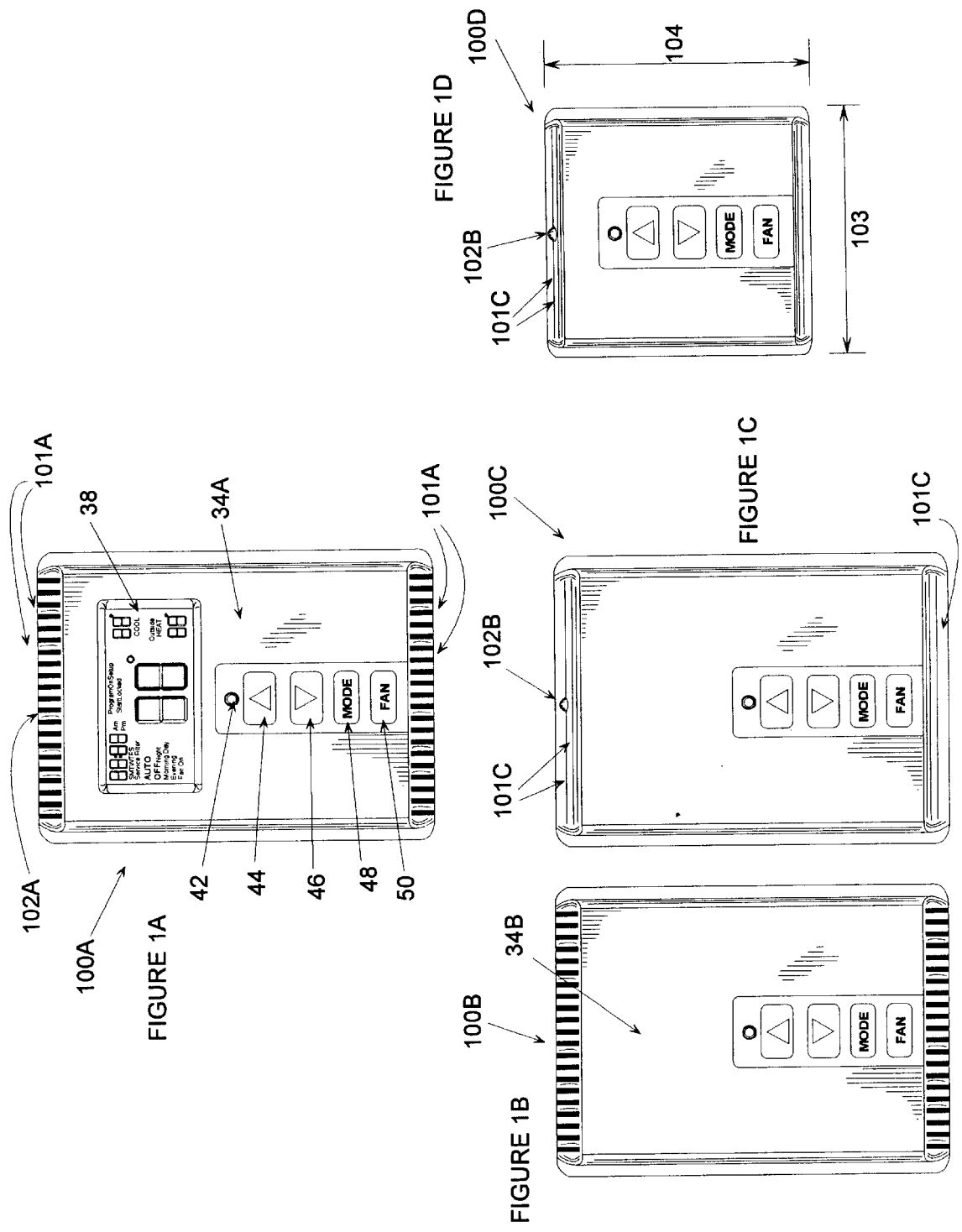

FIGURE 4
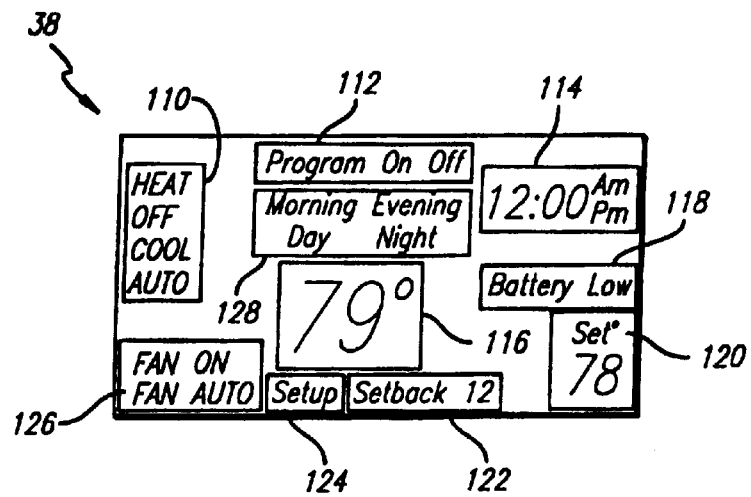
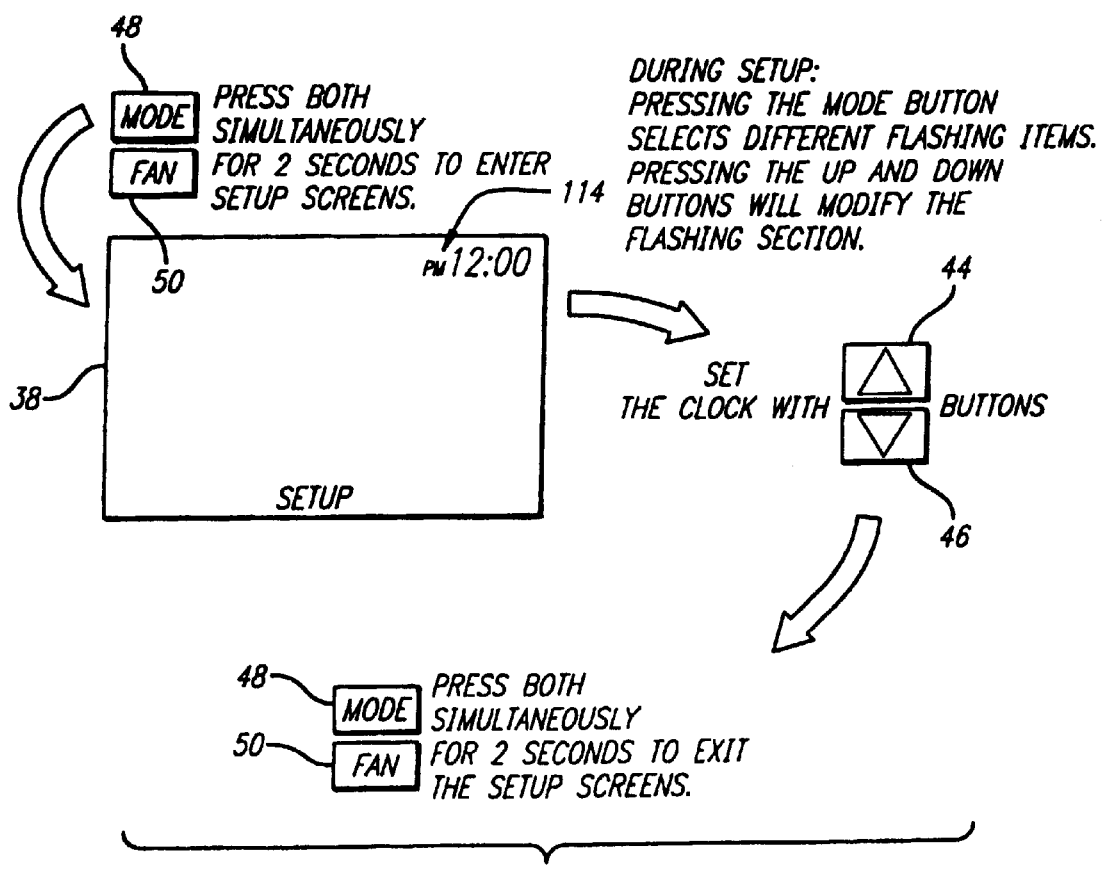
FIGURE 5

(1 OF 3)

(2 OF 3)

(3 OF 3)

WIRELESS PROGRAMMING OR PROGRAMMABLE THERMOSTAT MOBILE UNIT FOR MULTIPLE SEPARATE CONTROLLER OR PROGRAMMABLE FIXED UNITS AND PROGRAMMING TRANSMISSION METHOD

This application claims benefit of, incorporates herein and is a continuation in part of U.S. patent application Ser. No. 08/802,640, filed Feb. 19, 1997 pending.

BACKGROUND OF THE INVENTION

The present invention relates to wireless communication with at least a controller portion of a thermostat.

Industrial application of heating, air conditioning and fan operations are significantly different from residential in especially the following manner. Industrial installations, as used herein, refer to the type of building or associated buildings so large as to maintain separately controlled equipment to condition air temperature or movement for personnel comfort or equipment maintenance. The separate controls are typically fairly widely separated devices fixed to a wall, sensing temperature or some other environmental parameter and controlling the heating, air conditioning or fan operation. Industrial installations include such locations as hotels, hospitals, office buildings, schools, and manufacturing or assembly plants. The separate controllers are typically thermostats unconnected by wire or wireless communication.

It has been an unpleasant and recurring chore that changing the settings of the several thermostats required that personnel walk to each of the thermostat locations and enter one or several parameter changes for each thermostat. With the advent of programmable thermostats comprising the several forms of sophisticated ramp-ups, set backs, occupation anticipation and departure modes, as well as the many other forms of economizing features developed in the prior art, the personnel in an industrial installation charged with making the thermostat changes is required to memorize and repeat the data entry and viewing steps to assure that each change was made and registered in the thermostat's programming.

To charge this task to the unskilled worker has meant entrusting that person with the potential of wasting significant energy in unnecessary heating or air conditioning and/or compromising personnel comfort with improper parameter entry. A single mistaken entry by even a skilled but inattentive employee in the course of changing or checking the thermostat settings will cause the same problems. With the power of programmable thermostats comes the potential of causing important and difficult to diagnose problems, problems that are multiplied with changes made in each separately programmed thermostat.

U.S. Pat. No. 3,979,060 describes a control apparatus for automatically enabling and disabling the thermostatic control of a plurality of industrial building temperature control units. A programmable timer is provided for adapting the control apparatus to a desired building use schedule. A manually operable override switch is also provided to allow for temperature control during unscheduled building occupancies and additional circuitry automatically disables the override switch to prevent the control apparatus from remaining overridden for an extended period of time in the event the override switch is not reset. The several thermostats described as controlled by the system of this patent are wired together and are intended to be controlled at some time period by a single programmed instruction flowing along a common wired connection to the several thermostats.

U.S. Pat. No. 4,718,599 describes a method for control override isolation or opening of steam supply valves for steam heated radiators in a residence by operation of a handheld infrared control device. A central heating control system includes a control panel housing a timer. The timer has three program sequences for controlling three groups of radiators each group being independently controlled. The control panel also includes switch units which are selectively operable to isolate each radiator. The switch units are triggered by infrared signals transmitted by a portable control unit. The signals may be received directly by the panel or indirectly through spaced windows coupled to the control panel by an optical fiber network.

It has not been known to solve the problem of repeated programming of transmission-isolated thermostats in industrial installations.

SUMMARY OF THE INVENTION

The present invention allows the user to quickly and repeatedly program one receiver controller device at least controlling one or more heating or cooling devices for one desirably separate zone of occupation to another such receiver controller device set at least controlling another separate set of heating or cooling devices for another desirably separate zone of occupation. The realities of present day industrial and commercial buildings is that they comprise many such separate zones of occupation with separate heating or cooling devices controlled with separate controllers due to the diverse nature of the desired temperatures, dead bands for controlling such temperatures, temperature and device operation ramping, times of occupation, economization measures imposed for each zone, and the many similar aspects of thermostatic control described herein and in the prior art.

With at least two receiver controller devices in transmission-isolated locations having at least some programming parameters in common with each other, the user will prefer to be relieved from the task of making the same programming inputs and/or menu scrolling followed by programming inputs at each location. The present invention comprises means for the user to make such changes in a mobile unit and wirelessly transmit them to the desired receiver controller device, where the information is stored and used to control the heating or cooling devices. With respect to the most efficient overall method of making this transmission, it is presently preferred to use infrared transmission and reception of data and program parameters between the transmitting programming device and the receiving controller device.

In one example, the present invention comprises single program input wireless transmission from a transmitter programming device without an information display screen to a receiver controller device with such a screen and lacking or having disabled or locked out program input means located on or about the device. In a further embodiment of this example, the parameters of the program transmitted from the transmitting programming device are stored in its memory, whereby all or a portion of those parameters are wirelessly transmissible in single or continuous transmission to other receiver controller devices with or without an information display screen. An information display screen as used herein infers other digital and analog devices which permit human perception of the information or changing program parameter. As a further embodiment of this example, the transmitting programming device may comprise means for selectively storing for continuous transmission to a receiver controller device only those program parameters which had changed since a prior wireless programming of the receiver controller device, such selective transmission achieving reduction in transmission time and reduction in potential transmission errors. As a further embodiment of this example, the receiver controller device comprises wireless transmission means and the transmitting programming device comprises wireless reception means whereby transmissions of program parameters from the programming device to the control device are re-transmitted to the programming device for comparing with the transmission from the programming device, providing also visual or audible means in the programming device for notification of successful or imperfect transmission of the parameters from the programming device to the controller device.

In another example, the present invention also comprises continuous wireless transmission of a plurality of program inputs stored in a memory of a transmitter programming device to the memory of a receiver controller device for control of heating or air conditioning devices controlled by the controller device. As a further embodiment of this example, all the parameters for a programmable thermostat are transmitted in a continuous wireless transmission from the memory of a transmitter programming device to the memory of a receiver controller device for control of heating or air conditioning devices controlled by the controller device.

In another example, the present invention comprises a programming device with the handheld programming transmission capabilities also comprising means for storing a set of default parameters for a basic, economy and/or advanced mode separate in its memory apart from program parameters inputted by the user for those modes, whereby a discrete button or set of button pushes to the programming device continuously wirelessly transmits to the controller device a set of default parameters to the controller device for control of heating and air conditioning equipment. In another embodiment of this example, the programming device is equipped with temperature sensing means whose output is periodically stored in the memory of the programming device, which value is transmitted to the controller device and compared with a temperature sensed value found there, whereby the comparison of the values permits calibration checking, i.e., if the values are significantly different, an audible or visual (light, etc.) signal is produced from the controller device alerting the programming device holder that the controller device may have a defective temperature sensing device. Other such calibration checks are possible in a similar manner with other parameters sensible by the controller device, such as motion or light detectors.

Where the wireless transmission is made by sonic or IR communication, there is typically little chance that such communication will be unintentionally transmitted to another controller unit with receiver means for the transmission, thus making the limited range means such as for sonic and IR transmission preferable for the present invention and eliminating the potential of different program parameters meant for one controller device to be received by another.

The nature and content of the wireless programming transmissions from a mobile to a fixed unit necessarily determine the means within each, i.e., primarily two modes of operation are preferable with the present invention. A first mode comprises performing all programming inputs desired for transmission to a fixed unit before any transmission thereto, making an appropriately proximal approach to the fixed unit and transmission of the appropriate programming inputs in a single continuous transmission.

A second mode comprises the user making an appropriately proximal approach to the fixed unit with the mobile unit and transmission of the appropriate programming inputs in more than one transmission, i.e., at the input of each mode change, that change is essentially instantly transmitted to the fixed unit. Although this is less preferable in most circumstances for ease of inputting, it is more preferable when the user has relatively few changes to make to the entire set of mode inputs.

DESCRIPTION OF THE DRAWINGS

The drawings accompanying this application designate like reference numerals to designate like parts.

FIGS. 1A–1D show the front face plate, thereby inferring the features of, a handheld wireless transmitter (optionally receiving) programming unit for transmission of program settings to a fixed receiver controller unit;

FIG. 4 shows a display portion of the transmitter unit of FIG. 1 and particularly illustrates an exemplary FIG. 5 shows the display portion of the transmitter unit during execution of a quick start software module;

DETAILED DESCRIPTION OF THE PREFERRED EMBODIMENTS

Figure 2B:
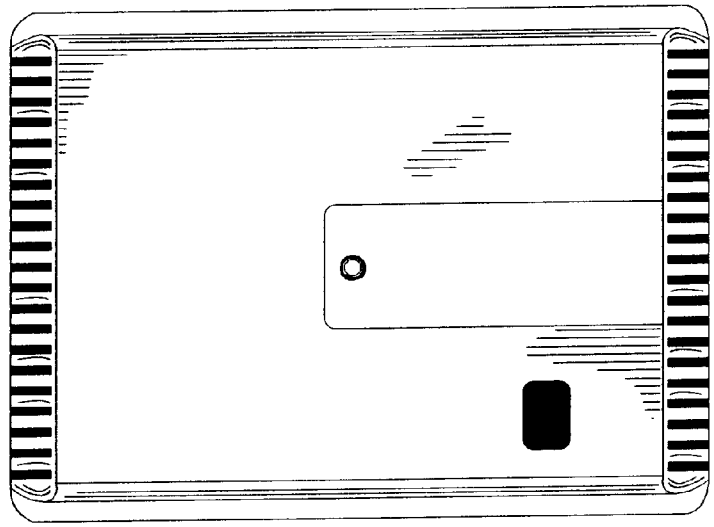
FIGS. 2A–2B show the fixed receiver controller unit.

FIGS. 1A–1D show four types of handheld transmitter programming units for the present invention. The programming device 100A shown in FIG. 1A includes a portable, hand-held transmitter housing 34 which is preferably formed from a light-weight plastic material. The housing 34 includes an aperture formed on the front side thereof as shown. The device 100A includes a display 38 which is visible through the aperture. The display 38 comprises for example, a liquid crystal display with a Thermoglow backlight. The housing 34 additionally includes a recessed edge which provides an open channel on the front side of the transmitter housing 34. The device 100A additionally includes a plurality of user input mechanisms which, in the exemplary illustrated embodiment, comprise an indicator light 42, an up button 44, a down button 46, a mode button 48 and a fan button 50. The remote programming by continuous transmission aspects of the present invention are implemented via the aforementioned user input mechanisms and are described below in greater detail.

It has been found that programming devices 100A–100D may comprise more or fewer components and functions according to cost and preference. In a more complete embodiment, device 100A comprises electronic means for digital display 38 and temperature sensing means, indicated as present in devices 100A and 100B by the presence of vents 101A, permitting convective flow through of air over temperature sensing means. In a less complete embodiment, device 100B eliminates the digital display means, and instead relies on interactive transmission to a controller device with such a digital display 201A as shown on controller device 200A in FIG. 2A. As a single input, stepwise transmission of the program parameters is recorded in the memory of device 200A upon input through programming devices, the program parameters are being stored in the memory of the programming device 100B–100D, although such interaction can be accomplished with the device 100A if preferred, although redundant with respect to digital displays. The program parameters stored in the programming device are then made continuously transmittable as a single transmission to controller devices such as controller device 200B, whereby neither the programming devices 100B–100D nor controller device 200B have a digital display screen.

The just described form of programming of the programming device through wireless interaction with a fixed controller device is unknown in the art of programmable thermostats. The elimination of the digital display screen not only reduces cost of parts, assembly and repair, but also permits size reduction of a magnitude generally seen in comparison with programming devices 100A–100C with programming device 100D. It is a further improvement that the programming device may eliminate temperature sensing means, such means being necessarily located on each fixed controller device. Programming devices 100C and 100D, indicated by eliminating vents on surface 101C, comprise no temperature sensing means. Such elimination of temperature sensing means is a contributor to the size reduction of the programming device 100D, which has a length 104 about half that of devices 100A–100C and a width 103 about two thirds that of devices 100A–100C. IR transmission/receiving means 102A (not shown) for devices 100A and 100B are located generally behind the vents 101A. IR transmission/receiving means 102B for devices 100C and 100D are located generally on surface 101C.

Figure 2A:
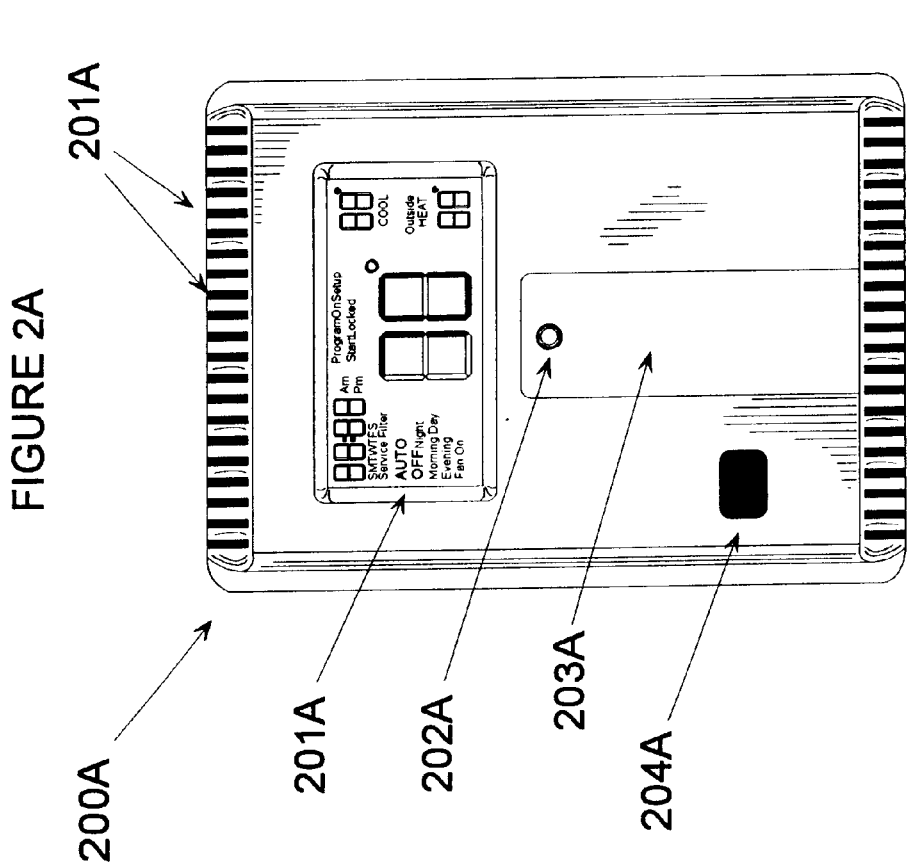
Figure 11:
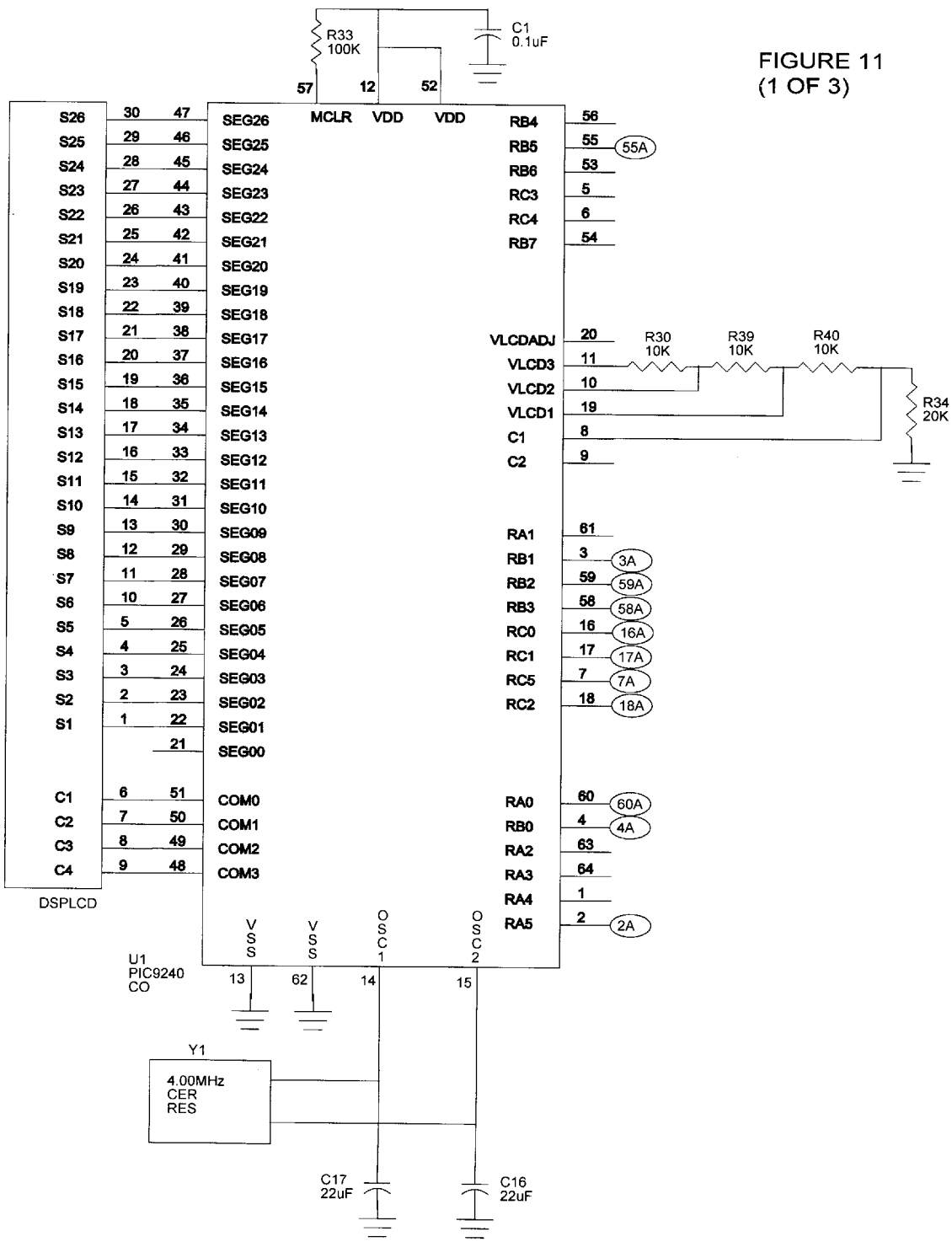
FIG. 11 is an electrical schematic of the receiver controller unit of FIG. 2A.
Figure 11:
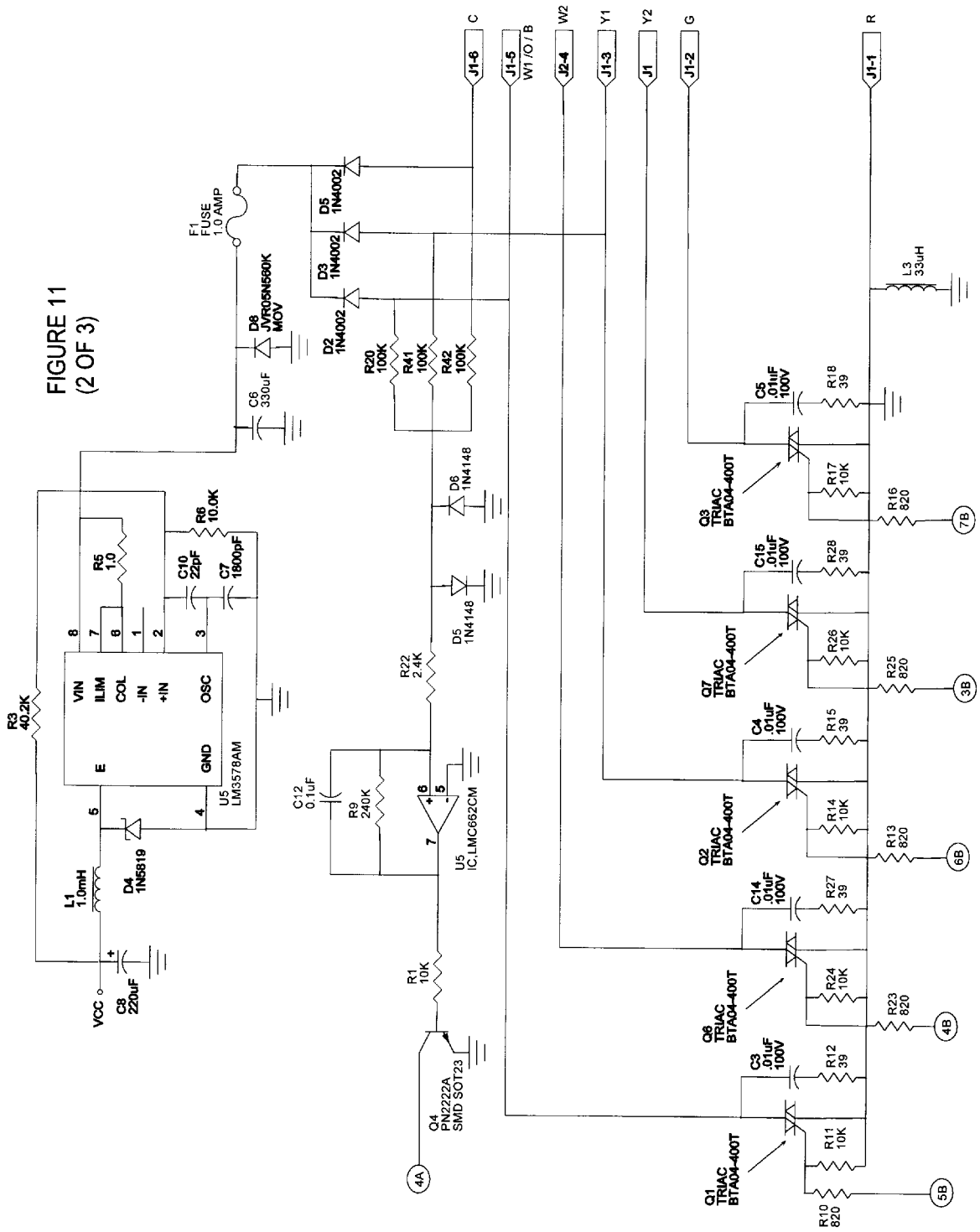
Figure 11:
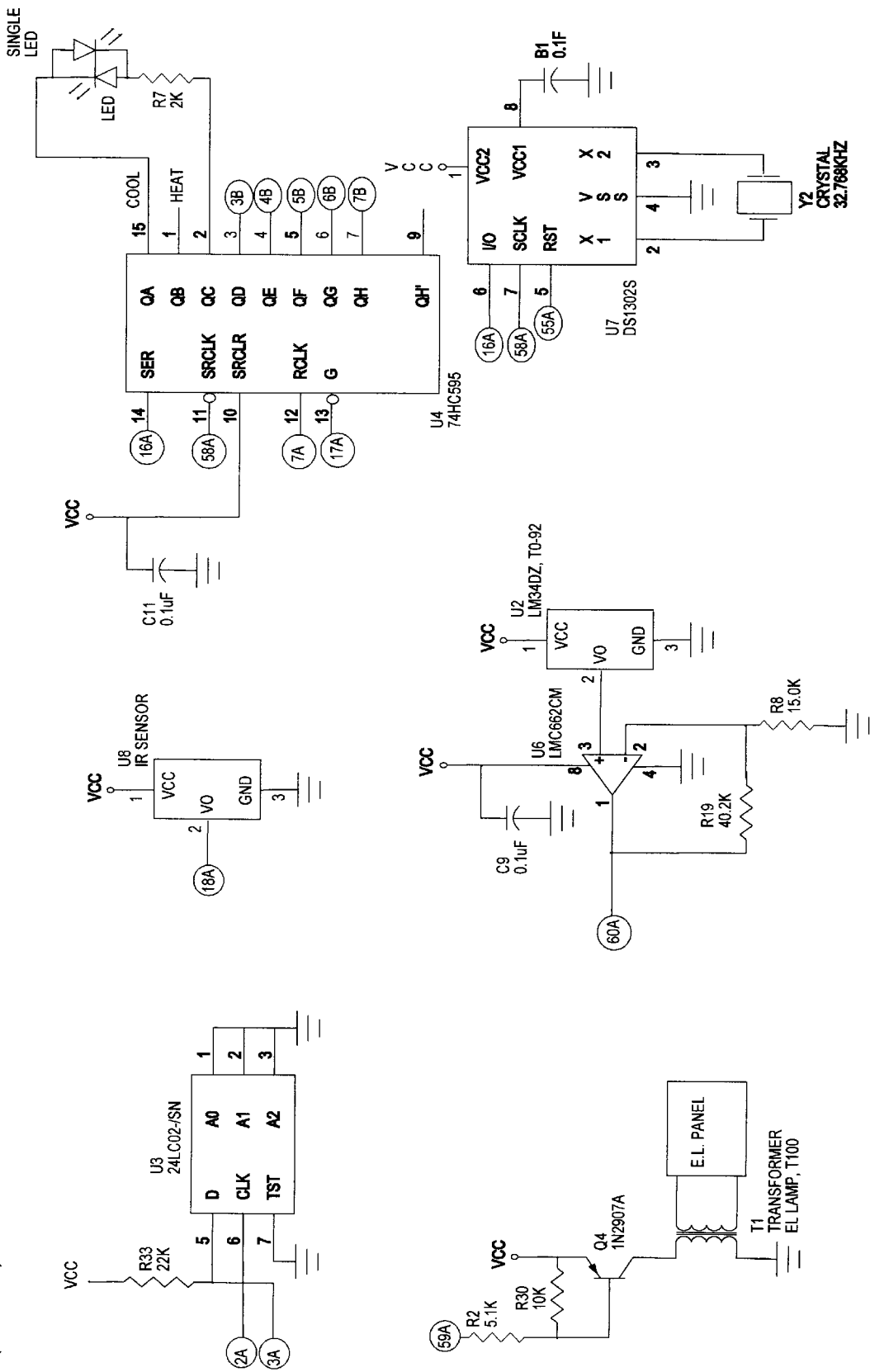

As shown with the combination of FIGS. 1A–1D for programming devices and FIGS. 2A and 2B for controller devices, an exemplary continuous transmission wireless programmable digital thermostat system includes at least a plurality of fixed receiver controller devices as in FIGS. 2A and 2B and a transmitter programming device as in FIGS. 1A–1D. Each controller device 200A or 200B includes a housing formed, for example, from a light-weight plastic, further preferably comprising vents 201A for convective air flow over temperature sensing means. The controller devices also include controller electronics shown in FIG. 11 are fitted within the housing. The controller electronics include an IR sensor U8 and is preferably, but not necessarily, mounted within the housing beneath window 204A in a position sufficient to send and/or receive IR signals to a programming device.

Figure 3:
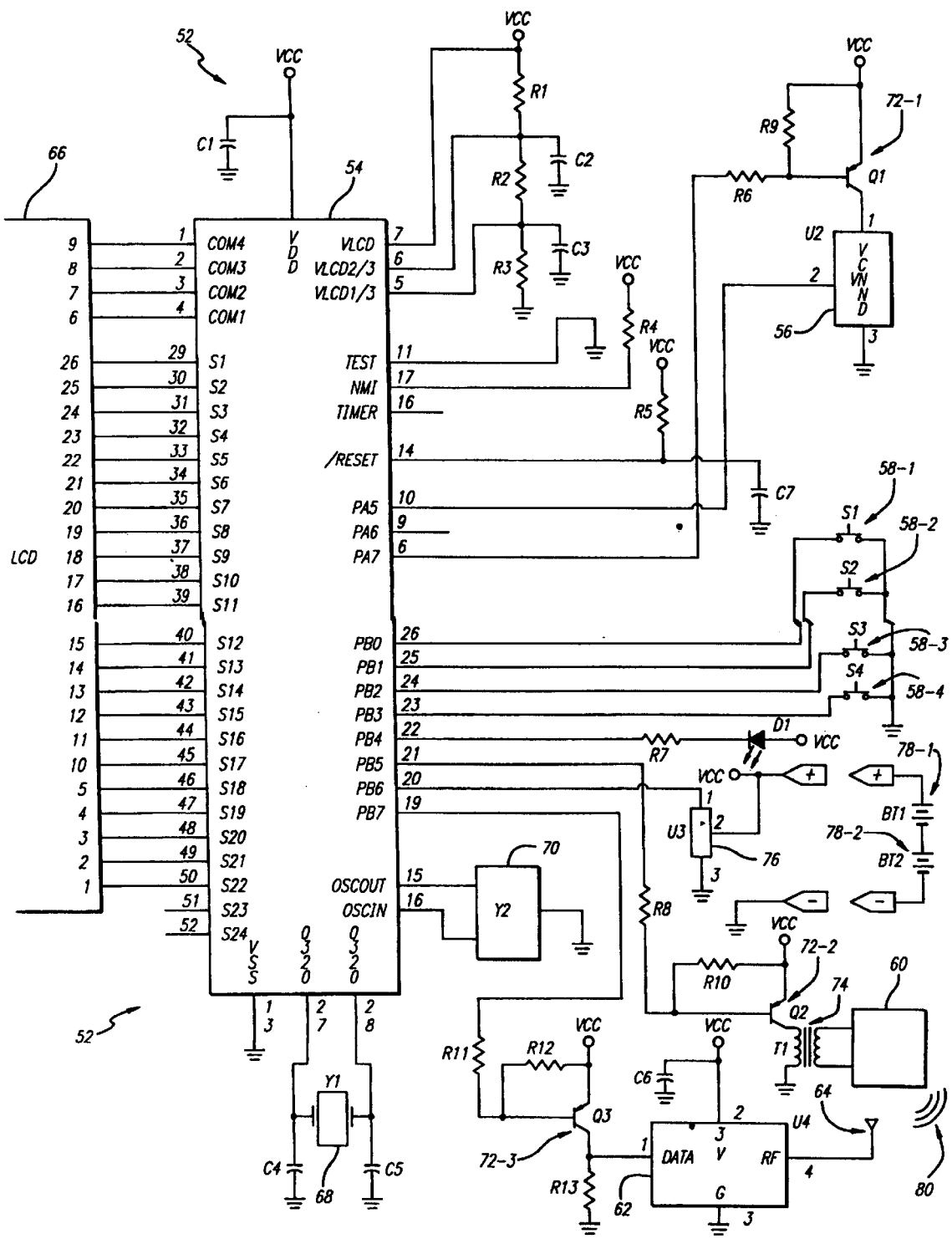
FIG. 3 is an electrical schematic of the transmitter programming unit of FIG. 1A.

Each programming device with a set of most features and functions such as devices 100A include transmitter electronics which are shown in schematic form in FIG. 3. Generally, the transmitter unit electronics 52 receive and process user inputs from the handheld device to generate wirelessly transmitted program input signals to the controller devices, either discretely in steps in the case of interactive programming for the programming device or with continuous transmission of a plurality of program parameters. According these objects, some of the input signals to the programming devices are transmitted and/or stored in the memory of the programming device and others are supplied to the display 38. The user inputs, as determined by actuations of the user input mechanisms, are provided to the transmitter electronics 52. The user inputs may also be provided wirelessly in wireless microprocessor 54, a temperature sensor 56, switches 58-1, 58-2, 58-3, 58-4, a lamp 60, a transmitter 62 and an antenna 64. An exemplary microprocessor 54 is the ST6245 manufactured by SGS Thompson. The display 38 includes a liquid crystal display (LCD) 66 which is electrically connected to the microprocessor 54 as shown. A crystal 68 and a ceramic resonator 70 are also electrically connected to the microprocessor 54 as shown. The crystal 68 preferably operates at 32.768 kHz and the ceramic resonator preferably resonates at 2.00 MHz. As may be readily appreciated, other timing or clocking schemes can be employed. The microprocessor 54 is also electrically connected to the temperature sensor 56 via a transistor 72-1 which, for example, comprises a 2N2907A transistor. The lamp 60 is electrically connected to the microprocessor 54 via a similar transistor 72-2 and a transformer 74 as shown. The transmitter 62 is connected to the microprocessor 54 via a transistor 72-3. The transmitter electronics 52 additionally include a voltage detector 76 connected to the microprocessor 54 as shown. The temperature sensor 56, transmitter 62 and voltage detector 76 respectively comprise, for example, an AD22103KT temperature sensor manufactured by Analog Devices, an HX-1003-1 transmitter manufactured by RF Monolithics and a TC54VC2902ECB voltage detector manufactured by Telcom. An exemplary LCD 66 comprises a BT-142ZAS manufactured by PICVUE.

The switches 58-1, 58-2, 58-3, 58-4 are mechanically connected to the fan button 50, mode button 48, down button 46 and up button 44, respectively. Although the preferred buttons 44, 46, 48, 50 comprise rubber buttons with carbon switching materials, other user input mechanisms can be employed. For example, the programming devices could be modified to transmit or receive infrared, wireless, optical, voice or other user inputs facilitating the desired switching at the input ports of the microprocessor 54 to the microprocessor 54 by batteries 78-1, 78-2 which comprise, for example, 1.5 volt, AA cell batteries electrically connected via the voltage detector 76 as shown.

With respect to FIG. 11, the electrical components are shown with preferred ratings or specifications below the component label. The component labels are designated with an "R" for resistors (whereby the rating is shown in Ohms), a "C" for capacitors, a "D" for diodes, a "K" for relays, an "ISO" for iso-optical coupler, a "Q" for transistors, a "U" for integrated circuits, an "L" for inductors, a "Y" for resonators, a "T" for transformers, an "S" for switches, and other appropriate designations as are well known in the art.

The thermostat electronics for the controller device with a digital display are described below with the understanding that they are generally illustrative of a low power programmable thermostat. Several aspects of the thermostat electronics are not described in detail, being understood by the skilled person with reference to FIG. 11, to comprise an optimized version of such a device.

A display DSPLCD, corresponding to display 201A in FIG. 2A, comprises for example, a liquid crystal display with a Thermoglow backlight. Non-wireless user input mechanisms are preferably eliminated from the controller devices, as indicated by the lack of input buttons on the exterior of devices 200A and 200B. The interactive programming aspects of the present invention are implemented via the aforementioned user input mechanisms and are described below in greater detail.

Some of the input signals are processed by the programming circuitry and others are supplied to the display DSPLCD. The user inputs, as determined by actuations of the user input mechanisms, are provided to the FIG. 3 electronics. The wireless user inputs may also be provided to microprocessor U1, a temperature sensor U2, a lamp SINGLE LED. The display DSPLCD includes a liquid crystal display 201A which is electrically connected to the microprocessor U1 as shown. A crystal Y2 and a ceramic resonator Y1 are also electrically connected to the microprocessor U1 as shown. The crystal Y2 preferably operates at 32.768 kHz and the ceramic resonator preferably resonates at 4.00 MHz. As may be readily appreciated, other timing or clocking schemes can be employed.

The microprocessor U1 is also electrically connected to the temperature sensor U7 via a microprocessor U6A. The lamp EL PANEL is electrically connected to the microprocessor U1 via a transistor Q4 and a transformer T1 as shown. The integrated circuit U3 is connected to U1 as shown.

The thermostat may include various combinations of environmental control apparatuses selected from a group comprising, for example, a heater, an air conditioning unit, a fan and heat pump. In the illustrated embodiment, the microprocessor U1 is programmable to expect an electric heat data bit and a heat pump data bit and, in a thermostat including an electric heater and a fan, a data bit is set such that the fan turns on instantly when heat is called for. In a thermostat including a single stage heat pump, a data bit is set such that the control signals generated by the microprocessor U1 are appropriately modified to accommodate a fan, compressor and reversing valve. Thus, another aspect of the present invention is the configurability of the thermostat. It should be appreciated that the thermostat can be modified to control additional and/or other apparatuses and devices such as a two-stage heat pump can be alternatively employed. Exemplary operating modes for the thermostat are discussed below in greater detail.

As shown in FIG. 11, the electronics also include control signal terminals R, C, W1/O/B, W2, Y1, Y2 which are electrically connected to the environmental control apparatuses mentioned above. More specifically, the terminal G provides a fan control signal. The terminal Y1 provides a cooling control signal. The terminal W1 provides a heating control signal. The terminal C provides a common or ground connection. The scope of the present invention also includes the provision of additional or different control signal terminals depending upon the nature of the apparatuses or devices to be controlled.

The thermostat electronics preferably include protection circuitry designed in consideration of the interface between the microprocessor U1 and the devices to be controlled thereby. Such protection circuitry includes the switching regulator U4 as well as the discrete circuit elements which include, but are not limited to, triacs Q1–3, 6, 7.

FIG. 4 illustrates an exemplary configuration of display fields within the display 38. Each display field preferably, but does not necessarily, occupy a predetermined portion of the display 38. Stated otherwise, the display 38 is preferably partitioned into non-overlapping portions which are each dedicated to providing a predetermined visual indicia of a user programming input or a monitored environmental condition of interest. In so partitioning the display 38, portions of the LCD 66 are selectively activated by the microprocessor 54 of the transmitter unit 24.

In the exemplary illustrated embodiment, the display fields include a mode indication display field 110 which includes "HEAT", "OFF", "COOL" and "AUTO" sub-fields. One of the aforementioned sub-fields is activated depending upon which operating mode for the controlled apparatuses is selected. When the sub-field "HEAT" is activated, this provides the user with a visible indication that a heating operation has been selected. When the sub-field "COOL" is activated, the user is provided with a visible indication that a cooling operation has been selected. When illuminated, the sub-field "AUTO" provides an indication that the system will automatically changeover between heat and cool modes as the temperature varies. When the sub-field "OFF" is activated, this indicates that the entire system is turned off.

The plurality of display fields also include a program indication display field 112 which indicates the status of a stored timer program, the operation of which is described below in greater detail. When the sub-fields "Program" and "On" are both activated, this provides the user with an indication that stored programming is currently being executed. When the subfields "Program" and "Off" are both activated, the stored timer programming is not currently being executed.

Various data and/or monitored environmental conditions of interest are also presented in the form of visible indicia. Thus, the exemplary illustrated display 38 further comprises a clock display field 114 with "[hours]:[minutes]", "Am" and "Pm" sub-fields as shown in FIG. 4. The display fields also include a temperature display field 116 and a battery low indication display field 118. The clock display field 114 preferably shows the current time and is used to program the timer periods as discussed below with reference to the user programming aspects of the present invention. The temperature display field 116 shows the current temperature as measured by the temperature sensor 56.

As shown in FIG. 4 a desired set temperature display indication of the desired temperature set by a user of the system 20. The displays fields also include a setback indication display field 122, a setup indication display field 124, a fan operation indication display field 126 and a timer period indication display field 128. The setback indication display field 122 includes sub-fields "Setback", "1" and "2" and indicates features pertaining to setback programming which is discussed below with reference to FIG. 8. The setup indication display field 124 includes a "Setup" sub-field and is discussed below with reference to FIGS. 5 and 9. The fan operation indication display field 126 includes "FAN ON" and "FAN AUTO" sub-fields and is discussed below with reference to FIG. 7. The timer period indication display field 128 "Day", "Evening" and "Night" subincludes "Morning", fields and is discussed below with reference to FIGS. 10A–10C.

A program executed by the microprocessor 54 provides an interactive programming interface which facilitates remote programming according to a plurality of programming modes of varying complexity. In a preferred embodiment, the plurality of programming modes comprise a basic programming mode, an economy programming mode and an advanced programming mode. Although all of the aforementioned programming modes may be implemented within a single computer executable program stored within or accessible to the microprocessor 54, they (and other executable program features) will hereinafter be referred to as "modules". Furthermore, it should be understood that each of the programming and/or control features described below can be implemented as a separate computer executable program, combined into several can also include an input port to facilitate uploading revised or updated versions of the executable program(s).

FIG. 5 shows the display 38 of the transmitter unit 24 during execution of a quick start software module by the microprocessor 54. Execution of the quick start software module begins when a user of the transmitter unit 24 presses both the mode button 48 and the fan button 50 simultaneously for some predetermined duration of time, e.g., two seconds. The clock display field 114 is first activated and, in the preferred embodiment, flashes while the time is being set up until the mode button 48 is pressed again indicating that the user wishes to enter the set time. The up button 44 and the down button 46 are selectively pressed to adjust the time in predetermined time increments such as 30 minute increments. It is further contemplated that the quick start software module may be modified such that the speed of transition from one time increment to the next differs depending upon how long either of the buttons 44, 46 is depressed. The transmitter unit 24 interactively prompts the user to provide other user inputs pursuant to a basic programming mode as discussed below with reference to FIG. 6. After screens by, for example, continuously pressing both the mode button 48 and the fan button 50 for two seconds.

Figure 6:
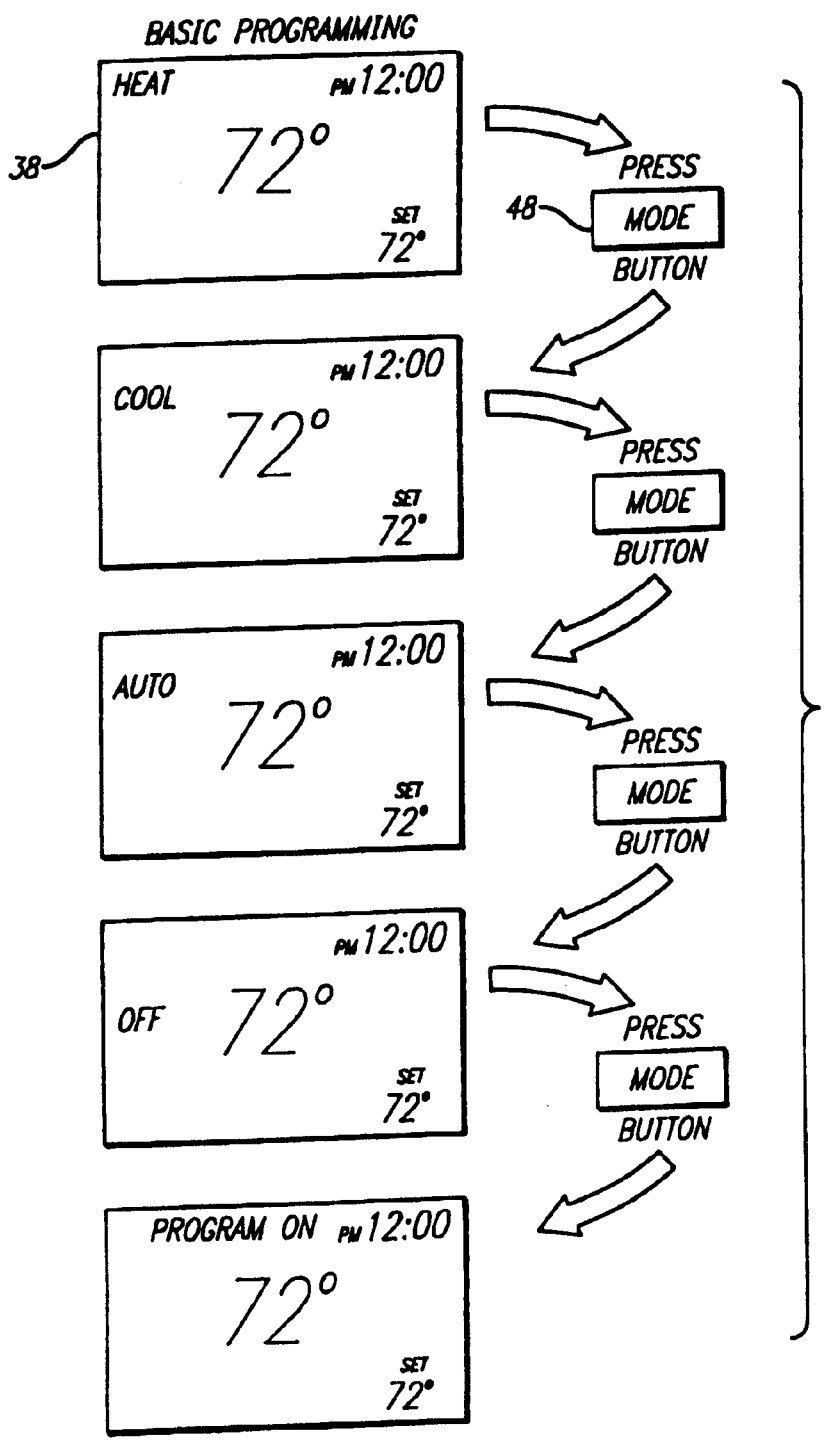
FIG. 6 shows the display portion of the transmitter unit during execution of a basic programming mode software module.

FIG. 6 shows the display 38 of the transmitter unit 24 during execution of a basic programming mode software module by the microprocessor 54. During execution of the basic programming mode software module, the up button 44 and the down button 46 are employed to set a desired temperature for a particular operating mode (to be distinguished from programming mode). The operating modes include a HEAT mode, a COOL mode, an AUTO mode and an OFF mode. During the HEAT mode, the microprocessor 54 generates and controls the transmission of input signals which are received by the receiver/controller unit 22 which processes the input signals to generate control signals which are, in turn, provided to a heating apparatus such as a furnace. During the COOL mode, the receiver/controller unit 22 provides the control signals to a cooling apparatus such as an air conditioner. During the AUTO mode, control signals are automatically provided to both a heating apparatus and a cooling apparatus depending upon the desired temperature set by the user and a measured temperature in the environment to be controlled. The present invention additionally contemplates program modifications to facilitate temperature sampling enhancements, averaging, etc.

Figure 7:
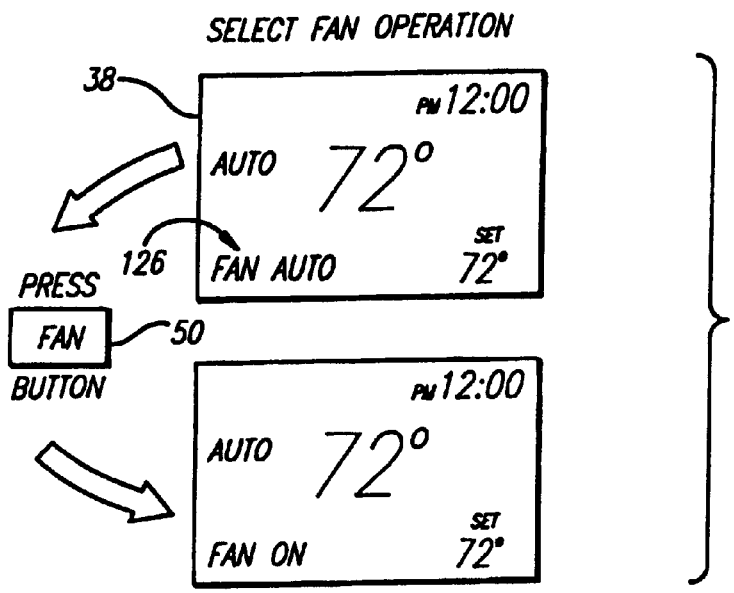
FIG. 7 shows the display portion of the transmitter unit during execution of a fan operation control software module.

Transitions between the aforementioned operating modes are controlled by pressing the mode button 48. Once a desired operating mode has been selected and a desired temperature entered via appropriate manipulation of the up and down buttons 44, 46, the user exits from the setup screens by simultaneously pressing the mode button 48 and the fan button 50 as discussed above with regard to FIG. 5. The bottom portion of FIG. 6 shows that the mode button 48 is also employed to initiate execution of stored four time period operation, an advanced programming mode feature which is described below in greater detail with FIG. 7 shows the display 38 of the transmitter unit 24 during execution of a fan operation control software module by the microprocessor 54. Execution of the fan operation control software module begins when a user of the transmitter unit 24 presses the fan button 50 for a predetermined period of time thereby activating the fan operation indication display field 126. As shown in FIG. 7, a user may alternatively select between one of two different fan operating modes by employing the fan button 50. The fan operating modes include a FAN AUTO mode and a FAN ON mode. The microprocessor 54 generates and controls the transmission of input signals which vary depending upon which fan operating mode is selected. The controller device receives and processes the input signals to generate control signals which are, in turn, provided to a fan or similar apparatus. When the FAN AUTO mode is selected, the fan turns on only when there is a demand for heating or cooling. When the FAN ON mode is selected, the fan runs continuously.

Figure 8:
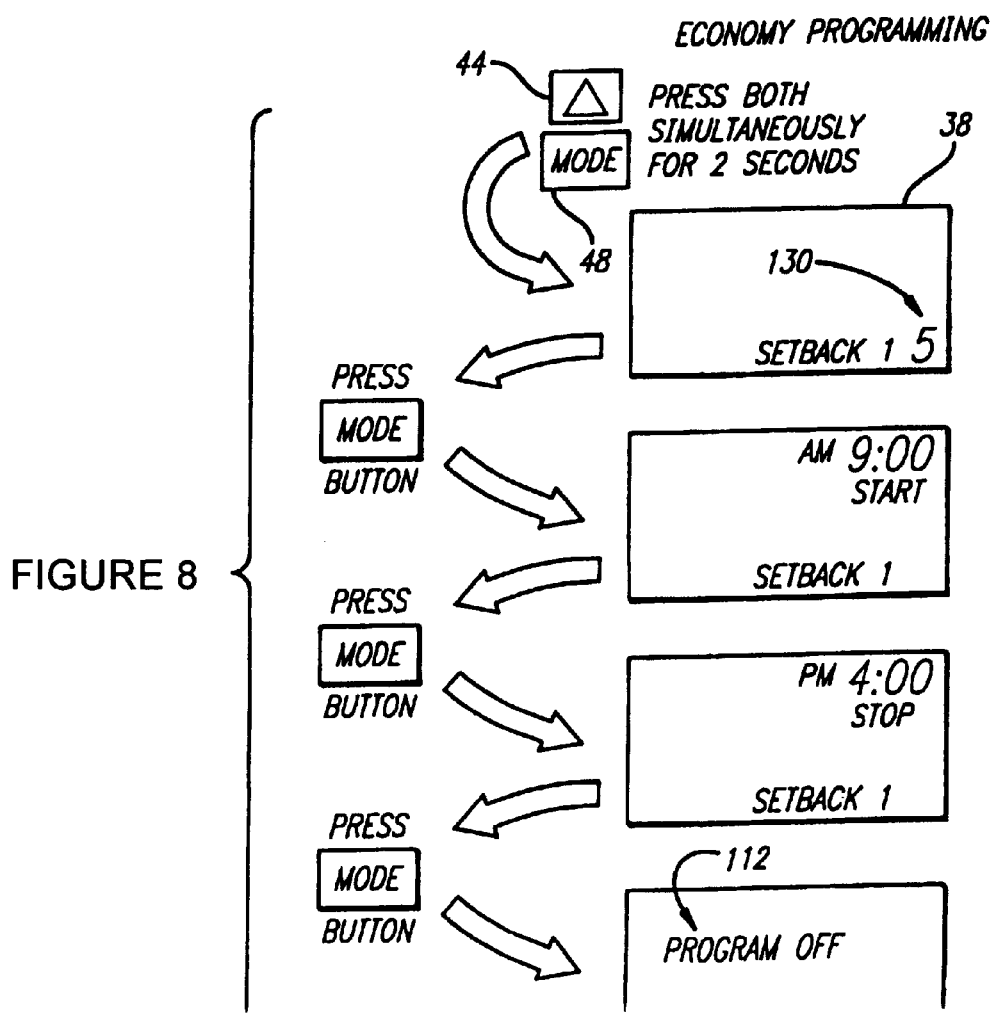
FIG. 8 shows the display portion of the transmitter unit during execution of an economy programming mode software module.

FIG. 8 shows the display 38 of the transmitter unit 24 during execution of an economy programming mode software module by the microprocessor 54. The preferred controller 86 at the receiver/controller unit 22 is programmed to operate according to two setback protocols which are designed to save energy. More specifically, the setback protocols are used during times when climate control adjustments are less frequently needed such as during sleep and away periods. The precise nature of these setback protocols is determined by the user who employs the economy programming mode software module to remotely establish the setback protocols. In a preferred thermostat system 20, the setback protocols can only be activated when the operating mode is HEAT, COOL or AUTO.

FIG. 8 illustrates how a first setback protocol (designated "Setback 111) is established. A user initiates execution of the economy programming mode software module button 48 for a predetermined amount of time. The user then uses the up and down buttons 44, 46 to select one of a predetermined group of temperature offsets (e.g., 5, 10, 15 or 20 degrees Fahrenheit) which is displayed at an offset temperature display field 130. During economy operation, a furnace or air conditioner will not turn on until the room temperature reaches the set temperature plus or minus the offset temperature. Once the desired offset temperature is selected, the mode button 48 is pressed to advance to the next two economy programming steps where start and stop times for the first setback protocol are similarly selected. A second setback protocol is established in identical fashion.

As illustrated at the bottom of FIG. 8, the program indication display field 112 provides an indication of whether or not a particular setback protocol is turned on. As with the other user inputs, the up and down buttons 44, 46 are employed to toggle the setback protocols between on and off operating statuses. When a user has finished programming the setback protocols, normal operation is resumed by simultaneously pressing the up button 44 and the mode button 48 for a predetermined amount of time. Conversely, economy programming can be turned on during normal operation by holding down the fan button 50 while pressing the up button 44. As may be readily appreciated, the microprocessor 54 can be programmed to respond in the same manner to different combinations of actuated user input mechanisms.

Figure 9:
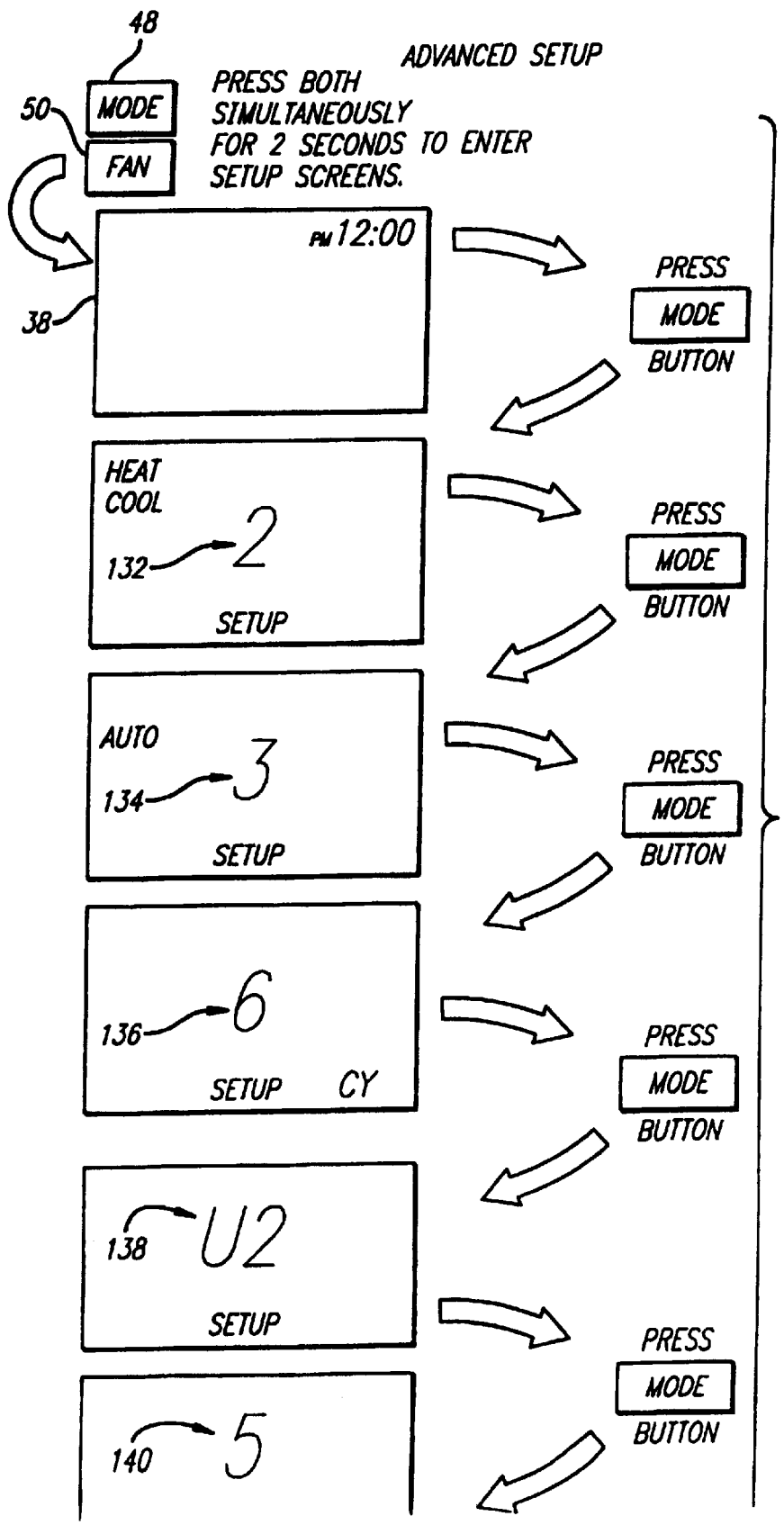
FIG. 9 shows the display portion of the transmitter unit during execution of an advanced programming setup software module.

FIG. 9 shows the display 38 of the programming device during execution of an advanced programming setup software module by the microprocessor 54. A user initiates execution of the advanced programming setup software module by simultaneously pressing the mode button 48 and the fan button 50. First, the user is given an opportunity to adjust the time which is shown in the clock user inputs) are entered by pressing the mode button 48.

After the selected time is entered, the advanced programming setup software module provides control signals to the display 38 to present the user with an interactive display including a manual mode temperature swing display field 132. The manual mode temperature swing is the difference in temperature the room has to be from the desired set temperature to turn on heat or cool when the system 20 is operating in the HEAT or COOL manual operating modes, respectively. For example, a setting of "2" will not allow the heat to turn on until the room temperature is 2 degrees colder than the desired set temperature. Although an exemplary default manual mode temperature swing is 2 degrees (i.e., factory setting), this can be adjusted by employing the up and down buttons 44, 46. An exemplary range of temperature swing adjustment for the manual mode is 1–6 degrees, adjustable in one degree increments. other ranges and increments of temperature swing adjustment can be employed. Furthermore, it is contemplated that separate temperature swings could be provided for each of the manual modes.

After the temperature swing for the manual mode is entered, the advanced programming setup software module provides control signals to the display 38 to present the user with an interactive display including an automatic mode temperature swing display field 134. The automatic mode temperature swing is the difference in temperature the room has to be from the desired set temperature to turn on heat or cool, depending upon which is needed, when the system is operating in the AUTO operating mode. As shown in FIG. 9, an exemplary default automatic mode temperature swing is "3". A preferred range of temperature swing adjustment for the automatic mode is also 1–6 degrees, adjustable in one degree increments.

After the temperature swing for the automatic mode is provides control signals to the display 38 to present the user with an interactive display including a heating cycles per hour display field 136. The number of heating cycles entered limits the heater's on/off cycles per hour. As shown in FIG. 9, an exemplary default maximum number of heating cycles per hour is "6". A preferred range of adjustment for the maximum number of cycles per hour is 2–6 cycles, adjustable in one cycle increments.

After the number of heating cycles per hour is entered, the advanced programming setup software module provides control signals to the display 38 to present the user with interactive displays including a transmitter unit identification (ID) display field 138 and a house number display field 140. The transmitter unit ID and house number are likewise adjustable by pressing the up and down buttons 44, 46. To return to normal operation, the user presses the mode button 48 and the fan button 50 simultaneously for a predetermined period of time.

Figure 10A:
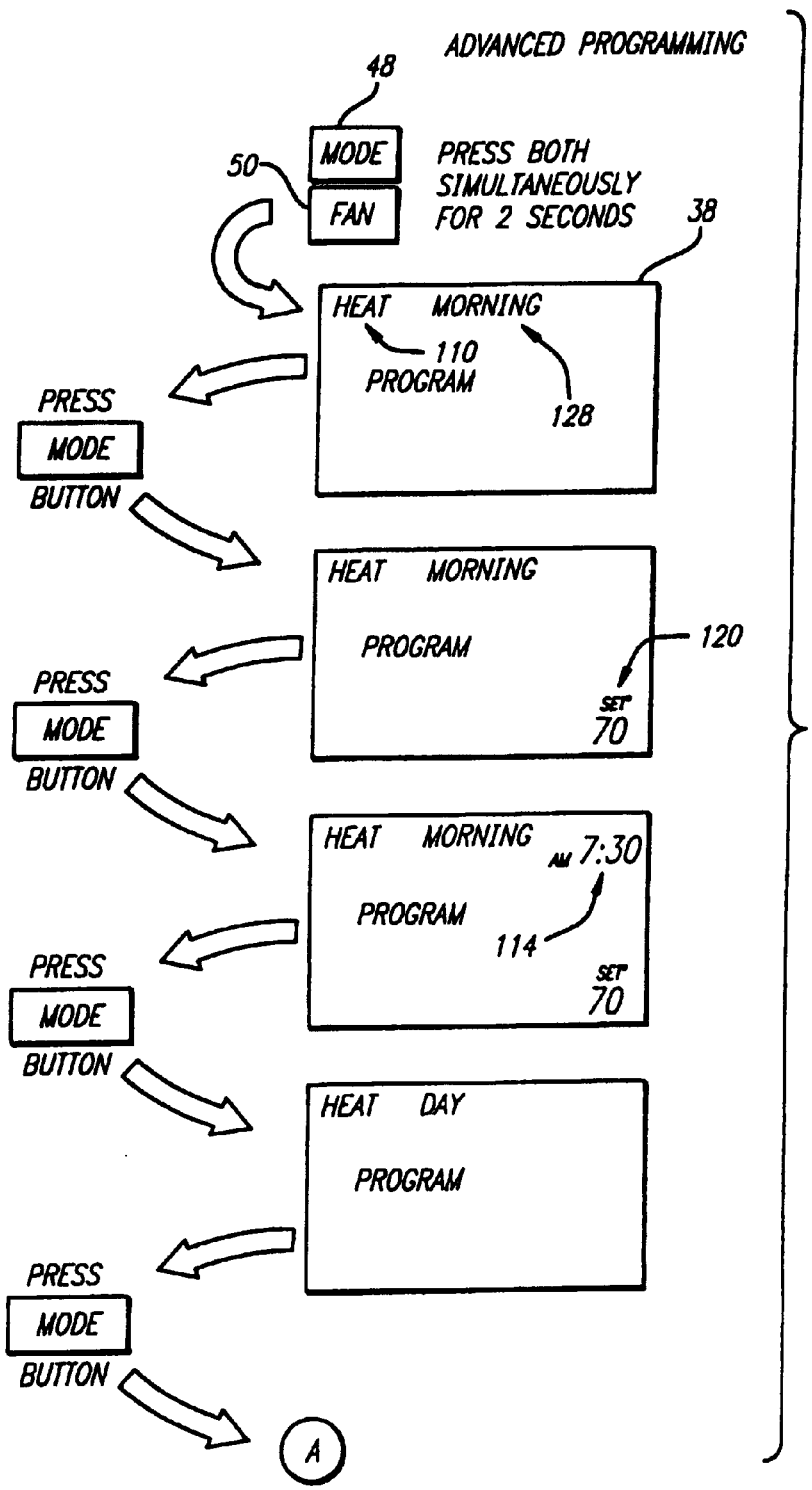
FIGS. 10A–10C show the display portion of the transmitter unit during execution of an advanced programming mode software module.
Figure 10B:
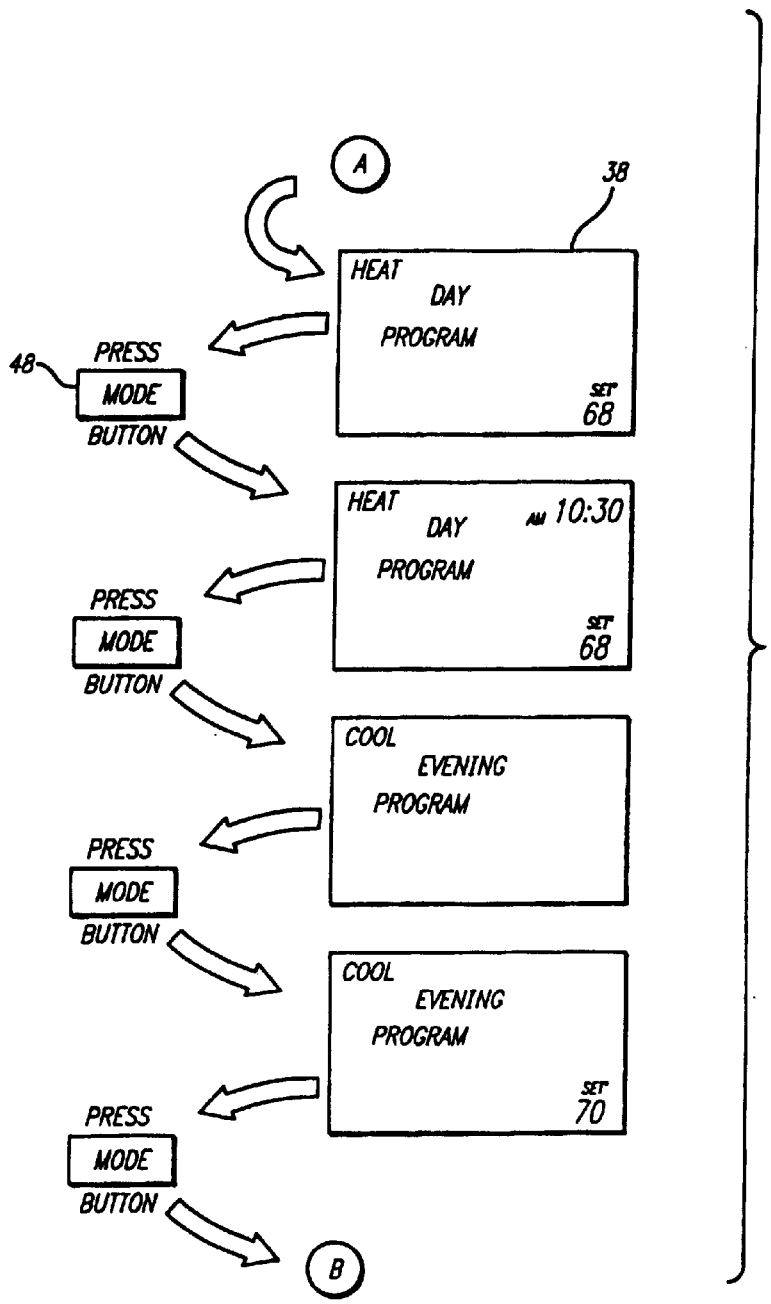
Figure 10C:
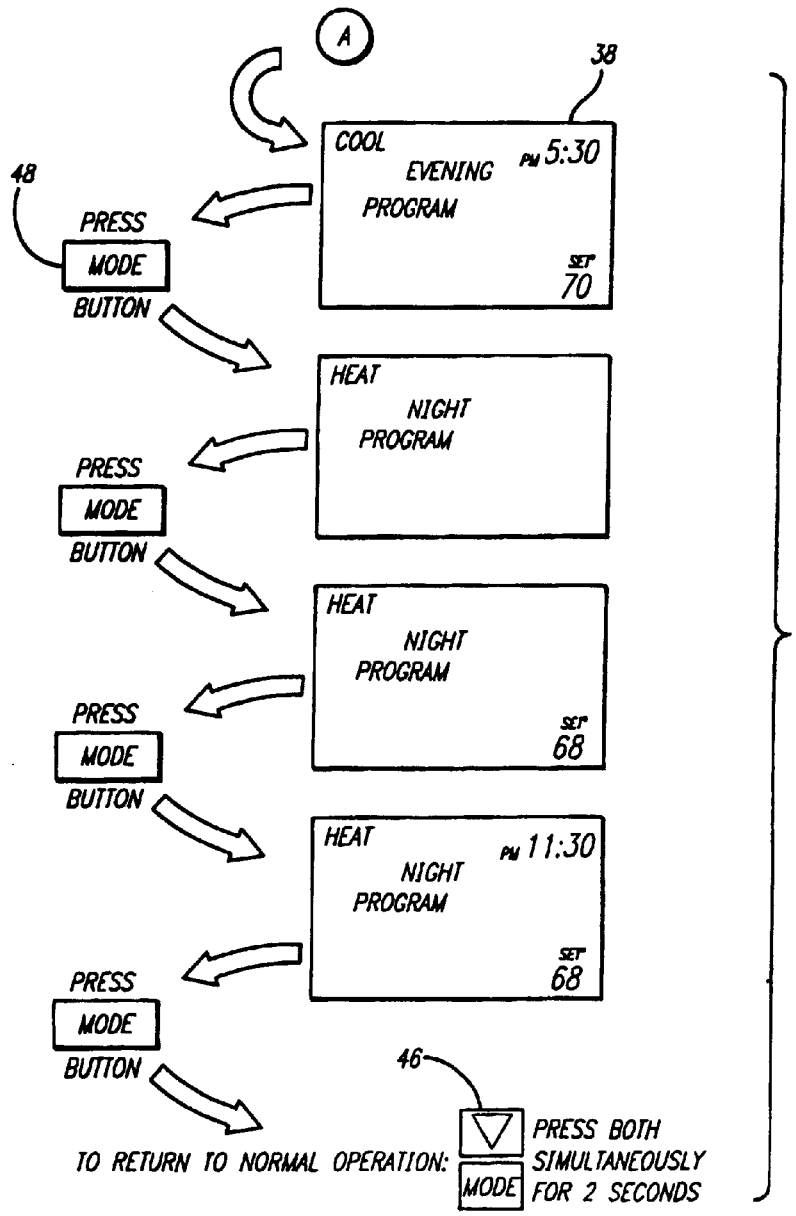

FIGS. 10A–10C show the display 38 of the programming device during execution of an advanced programming mode software module by the microprocessor 54. The advanced programming mode offers a user friendly, interactive display which serves to simplify an otherwise potentially confusing programming task. More specifically, the advanced programming mode provides a "multiple time period" programming feature. In the illustrated exemplary embodiment, the multiple time periods comprise morning, day, evening and night. Sub-fields of the timer period indication display field 128 are selectively activated depending which step of the advanced programming mode software module is currently being executed.

Referring to FIG. 10A, the up and down buttons 44, 46 are first employed by the user to select between one of the HEAT and COOL operating modes for use during the morning time period. The HEAT operating mode is shown as selected by illumination of the HEAT sub-field within the mode is entered for the morning time period, the advanced programming mode software module provides control signals to the display 38 to present the user with interactive displays which show a morning set temperature within the desired set temperature display field 120 and a morning start time within the clock display field 114. The user adjusts the morning set temperature and the morning start time as desired. Operating modes, set temperatures and start times for the day, evening and night time periods are thereafter entered by the user in response to substantially identical sequences of user prompts provided at the display 38. To return to normal operation, the user presses the down button 46 and the mode button 48 simultaneously for a predetermined period of time.

The microprocessor 54 of the programming device generates and manipulates a variety of control variables associated with each of the programming modes and, preferably, is programmed to facilitate automatic adjustments in the control variables as appropriate. For example, various timers are implemented to generate the control signals while the thermostat system is operating in the AUTO operating mode. Also, control variables relating to a desired operating mode need to be periodically updated when time period programming has been activated.

By way of example and not of limitation, the transmitters and receivers each weigh only a few ounces, and less than a pound, and may have dimensions such as 5 inches by 3 inches by 1½ inches or less.

It has been described above that a relatively extensive set of program parameters may be stepwise input by a user to a programming device and wirelessly transmitted to a controller device. The effort to duplicate this effort at a plurality of control devices in an industrial installation is critical although, with the devices of the prior art, takes substantial time and is filled with potential for by mistake or intentionally allowing different settings in different control device locations. Energy savings in balance with personnel comfort are most easily planned when the same control program and parameters are used where needed.

In a preferred transmission mode, a programming device will contain by default or previous programming inputs all the desired parameters necessary to control all functions of the controller device. As an example, the above steps of setting time and temperature related data for the Basic mode have been completed and exist in the memory of the programming device although not in a controller device. This programming may have been accomplished with a programming device 100A with a display device or as in devices 100B–100D with the assistance of a device 200A or an "office" dummy controller device not connected as a controller, but made available to a management personnel for programming the programming devices 100B–100D, whereby the programming device may be given to a menial, lower paid employee to take into the industrial installation for transmission of the program parameters to the controller devices therein.

The programming device carrying untransmitted program parameters is then preferably directed by hand with the IR sensors of the programming device and the controller device in operative distance of each other. A portion of the resident programming in the programming device comprises instructions and means, upon access through the user input devices as described above (or more preferably, to provide a separate button on the programming device housing for wireless transmission of a plurality of program parameters), to continuously transmit through the IR sensor of the programming device all or at least a plurality of the program parameters for a desired program or mode. Where less than all the parameters are transmitted, the resident programming in the programming device comprises instructions and means whereby comparison is made with a previous set of stored program parameters and only those that have changed since the last wireless transmission are sent to the controller device. Limited transmission reduces necessary transmission time and reduces the chance that errors in transmission will be introduced.

Upon receipt of transmission of at least two or up to a full set of program parameters from the programming device, the controller device responds with a short flashing of the LED 202A to indicate to the person holding the programming device that the transmission was received. Where a full set of program parameters are to be received by the controller device from the programming device, a comparison of the number of parameters received with the number of program parameters will indicate whether a complete transmission was received. An audible or visual (as with LED 202A) will alert the person holding the programming device that an incomplete transmission was made and should be repeated.

As another method for checking transmission error, both the programming device and the controller device comprise wireless receiving and transmitting means, whereby the controller device, after receiving at least a plurality of program parameters, re-transmits those parameters to the programming device for comparison with the originally transmitted parameters. If an error is detected, the programming device comprises means for alerting the person holding the programming device that an error in transmission has occurred, either with an audible or visual (as with LED 42) signal.

It will be another embodiment of the present invention to provide a greater number of buttons on the programming device, albeit providing programming and electronics sufficient for an expanded user interface. The additional buttons will provide for quickness in programming and operation, i.e., a set of buttons as shown in FIGS. 1A–1D, additionally including the following:

| BUTTON LABEL | BUTTON FUNCITON |
| --- | --- |
| HEAT | Access heating control program. |
| COOL | Access cooling control program. |
| NEXT | Access another program parameter. |
| SETUP | ACCESS the "Setup" progra. |
| RESTORE DEFAULTS | Resets transmittable parameters to defaults. |
| CALIBRATE | Access calibration program. |
| MEMORY | Access memory contents. |
| BLASTER | Transmit plurality of program parameters from the programming device to the controller device in a continuous transmission. |

It has been found that the above extended button set may be installed on a housing about the required electronics such that the programming device size is about 2–2½ inches wide by 3–3½ inches long by ½ inch thick. Such a compact device makes carrying and transmitting the program parameters from a programming device to a controller device easy and effortless.

The above design disclosures present the skilled person with considerable and wide ranges from which to choose appropriate obvious modifications for the above examples. However, the objects of the present invention will still be obtained by the skilled person applying such design disclosures in an appropriate manner.

What is claimed is:

1. A method for wirelessly programming programmable thermostats comprising:
   (a) a programming device comprising means for storing program parameters for a programmable thermostat and wirelessly transmitting a plurality of those program parameters to a controller device;
   (b) a programmable thermostat comprising the controller device comprising means for controlling heating or air conditioning equipment with program parameters and for accepting such program parameters only wirelessly from the programming device;
   (c) causing the programming device to wireless transmit to the controller device at least a plurality of program parameters, whereby at least a plurality of program parameters are received into a memory of the controller device; and
   (d) the programming device further comprises a user input interface without means for displaying those inputs on the programming device and adapted for inputting program parameters into a memory of the programming device, the user then inputting program parameters by observing display of those parameters on display means separate from the programming device.

2. The method of claim 1 wherein the programming device, during user input of program parameters, wirelessly transmits to a controller device, the controller device further comprising display means for parameters stepwise entered by a user into the programming device, each program parameter as it is inputted by the user into the programming device and thereby the controller device subsequently displays the program parameter input on the display means.

3. The method of claim 1 wherein a program for the programmable thermostat consists of a definite set of variable program parameters and wherein the programming device retains in a memory all of a desired set of that definite set of variable program parameters, the programming device then wirelessly transmitting to the controller device in a continuous transmission all of a desired set of that definite set of variable program parameters.

4. A method for wirelessly programming programmable thermostats comprising:
   (a) a programming device comprising means for storing program parameters for a programmable thermostat and wirelessly transmitting a plurality of those program parameters to a controller device;
   (b) a programmable thermostat comprising the controller device comprising means for controlling heating or air conditioning equipment with program parameters and for accepting such program parameters wirelessly from the programming device;
   (c) causing the programming device to wireless transmit to the controller device at least a plurality of program parameters, whereby at least a plurality of program parameters are received into a memory of the controller device; and
   (d) the programming device further comprises a user input interface without means for displaying those inputs on the programming device and adapted for inputting program parameters into a memory of the programming device, the user then inputting program parameters by observing display of those parameters on display means separate from the programming device.

5. The method of claim 4 herein the programming device, during user input of program parameters, wirelessly transmits to a controller device, the controller device further comprising display means for parameters stepwise entered by a user into the programming device, each program parameter as it is inputted by the user into the programming device and thereby the controller device subsequently displays the program parameter input on the display means.

6. The method of claim 4 wherein a program for the programmable thermostat consists of a definite set of variable program parameters and wherein the programming device retains in a memory all of a desired set of that definite set of variable program parameters, the programming device then wirelessly transmitting to the controller device in a continuous transmission all of a desired set of that definite set of variable program parameters.

7. A method for wirelessly programming a programming device comprising:
  (a) the programming device comprising means for storing program parameters for a programmable thermostat and wirelessly transmitting one or more program parameters to a display device, the programming device having a user input interface adapted for inputting program parameters into a memory of the programming device although without means for displaying those inputs on the programming device;
  (b) the display device comprising reception means for wireless transmissions from the programming device and for displaying those transmissions on a display observable by the user of the programming device; and
  (c) the user then inputting program parameters to the programming device, wireless transmission of the inputs by the programming device to the display device and reception and display of the inputs by the display device.

8. The method of claim 7 wherein:
  (d) a programmable thermostat comprises a controller device comprising the display device, means for controlling heating or air conditioning equipment with program parameters and for accepting such program parameters only wirelessly from the programming device; and
  (e) causing the programming device to wireless transmit to the controller device at least a plurality of program parameters, whereby at least a plurality of program parameters are received into a memory of the controller device.

9. The method of claim 8 wherein a program for the programmable thermostat consists of a definite set of variable program parameters and wherein the programming device retains in a memory all of a desired set of that definite set of variable program parameters, the programming device then wirelessly transmitting to the controller device in a continuous transmission all of a desired set of that definite set of variable program parameters.

* * * * *